Oct. 18, 1949.　　　W. P. WINTERS　　　2,484,868
SIDE SEAM CONTAINER ELECTRIC WELDING MACHINE
Filed Jan. 2, 1946　　　　　　　　　　　　4 Sheets-Sheet 1
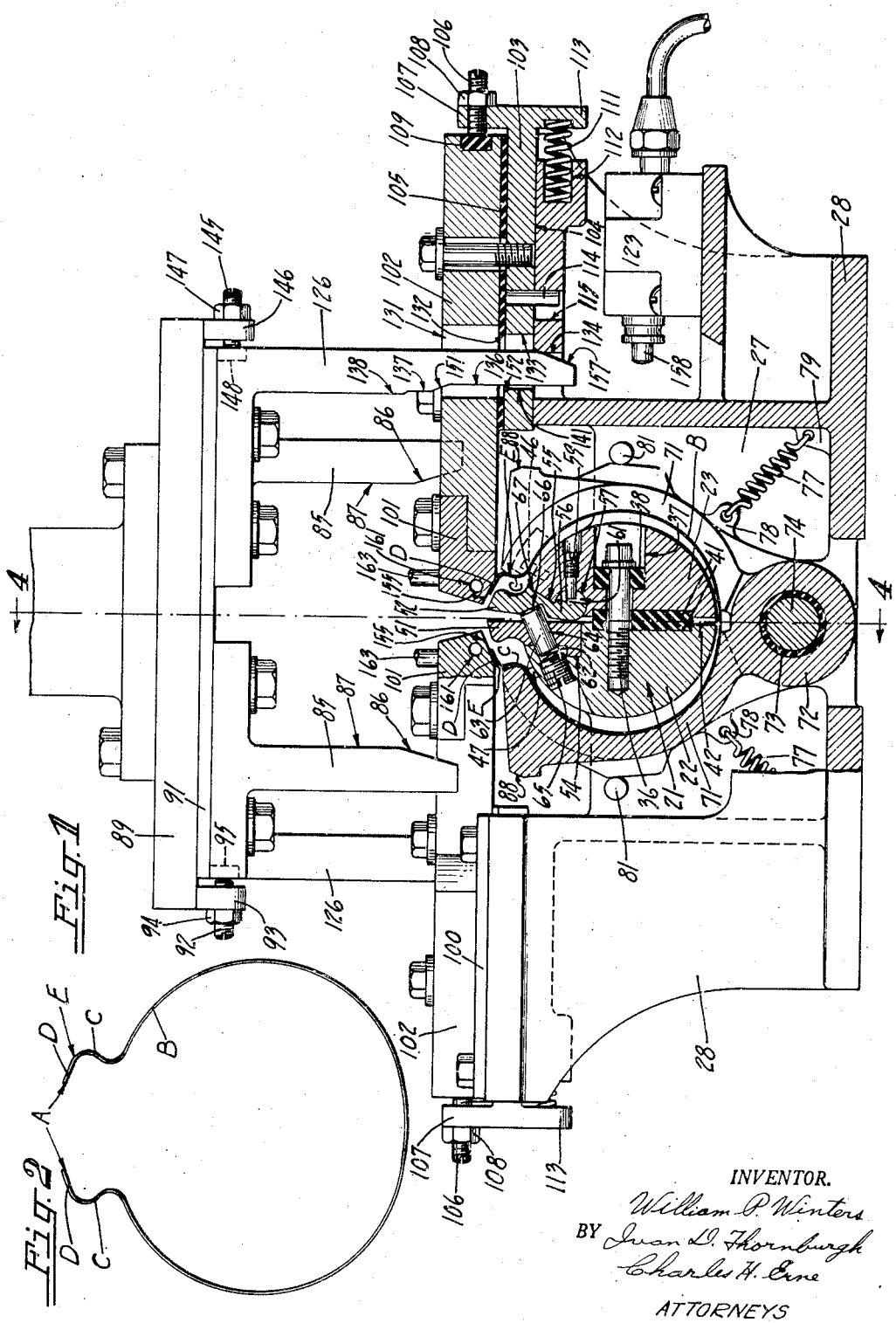
INVENTOR.
William P. Winters
BY Ivan D. Thornburgh
Charles H. Erne
ATTORNEYS

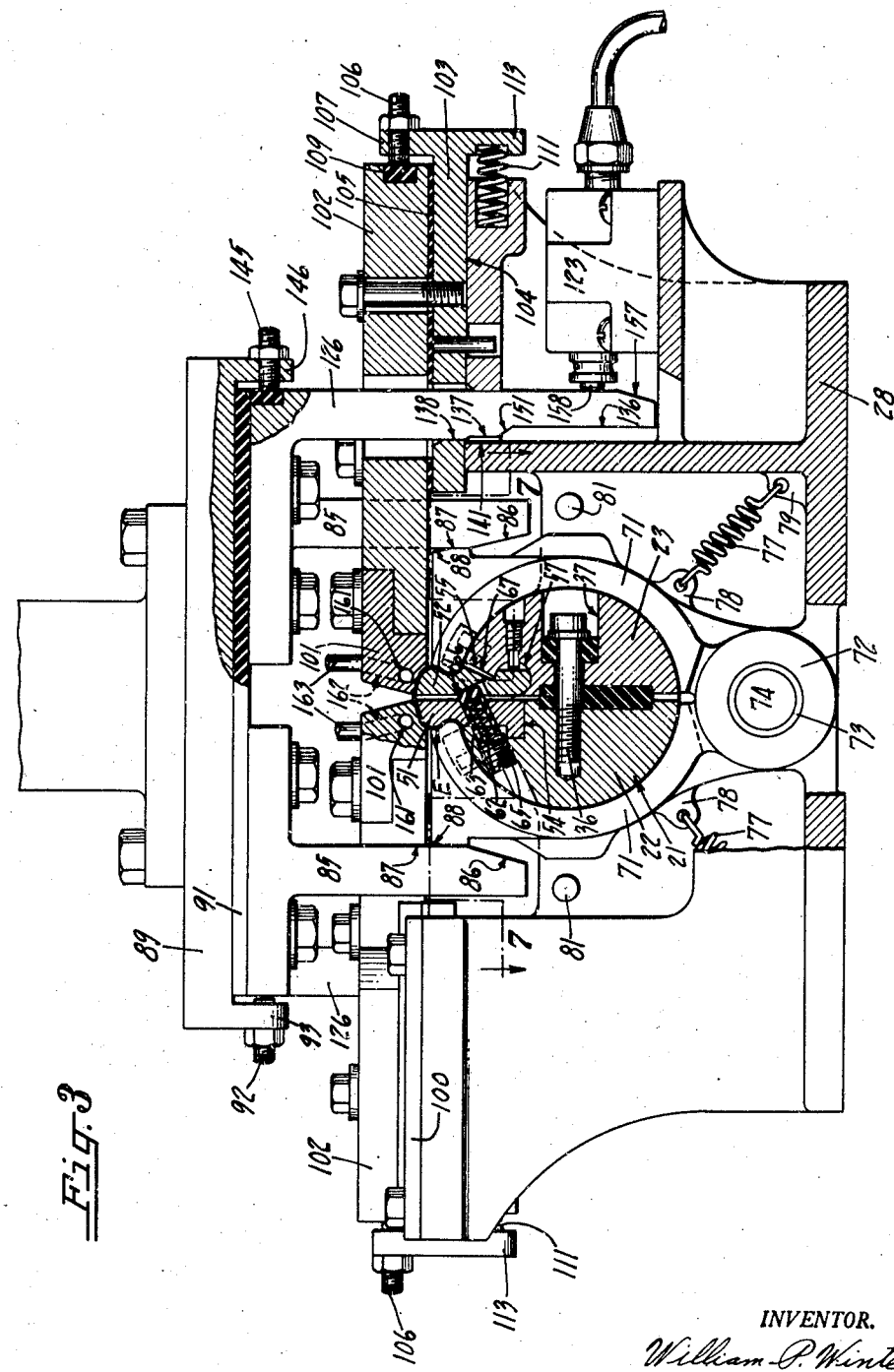

INVENTOR.
William P. Winters
BY Ivan D. Thornburgh
Charles H. Line
ATTORNEYS

INVENTOR.
William P. Winters
BY Ivan D. Thornburgh
Charles H. Erne
ATTORNEYS

Patented Oct. 18, 1949

2,484,868

UNITED STATES PATENT OFFICE 2,484,868

SIDE SEAM CONTAINER ELECTRIC WELDING MACHINE

William P. Winters, Cincinnati, Ohio, assignor to American Can Company, New York, N. Y., a corporation of New Jersey Application January 2, 1946, Serial No. 638,664

5 Claims. (Cl. 219—6)

The present invention relates to electric welding machines and has particular reference to machines for butt welding complementary edges of thin metallic sheet material such as the side seam edges of sheet metal containers or cans. This is an improvement over the apparatus disclosed in United States Patent 1,850,176, issued March 22, 1932, to J. F. Lawson, on Method of and apparatus for electric resistance welding and is particularly adapted to the welding of short seams in which it is desired to weld the full length of the seam simultaneously instead of progressively.

The material from which can bodies are made is comparatively thin, ranging approximately from 8 to 13 thousandths of an inch in thickness, although in some containers material as thick as 60 thousandths of an inch is sometimes used. Due to this thinness of the material, it is exceedingly difficult to align the edges of the body in a lateral direction for a butt welding operation. This difficulty has been somewhat overcome by preforming the edges of the body to be welded to stiffen them or make them rigid as by off-setting them in an S or angular shaped wall section extending longitudinally of the body adjacent each edge and located one on each side of the seam to be welded, thus setting off the opposed longitudinal side seam edges in a projected extension of the body. With such an extension of the body the edges to be welded may be readily brought into position for welding. After the welding operation the body extension may be eliminated by rolling or swedging if such an extension is undesirable in the welded can body.

An object of the invention is the provision of a welding machine for butt welding the side seam edges of such a can body simultaneously along its entire length wherein provision is made for supporting the projected extension of the body during the welding operation and for movement of the supports so that the side seam edges in the body extension may be pressed together while being welded to complete the weld.

Another object is the provision of such a welding machine wherein the welding electrodes are arranged for brushing contact with the can body adjacent the edges to be welded to facilitate contact with the can body and to insure proper pressure between the edges of the body during the welding operation.

Numerous other objects and advantages of the invention will be apparent as it is better understood from the following description, which, taken in connection with the accompanying drawings, discloses a preferred embodiment thereof.

Referring to the drawings:

Figure 1 is a front end view of a machine embodying the instant invention, with parts broken away and parts shown in section;

Fig. 2 is an end view of a can body to be welded in the machine shown in Fig. 1;

Fig. 3 is a view similar to Fig. 1 with the moving parts shown in a different position;

Fig. 6 is a top plan sectional view taken substantially along the broken line 6—6 in Fig. 4 and at the same scale as Fig. 5.

Figure 4:
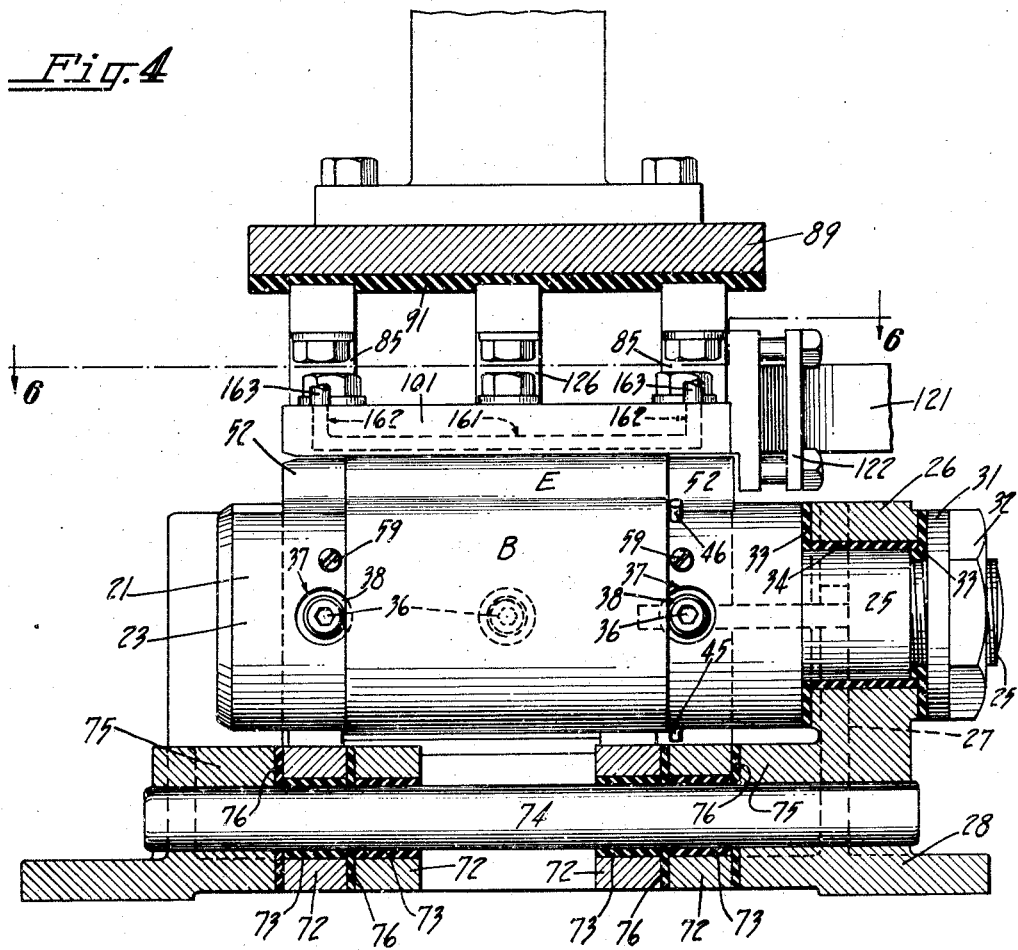
Fig. 4 is a sectional view taken substantially along the line 4—4 in Fig. 1, parts being shown in full lines.

As a preferred embodiment of the instant invention the drawings illustrate a machine for welding by the electric resistance welding process, complementary side seam edges A (Fig. 2) of a sheet metal tubular can body B. The drawings disclose a cylindrical can body in place in the machine although the invention is equally well adapted to rectangular or other shaped can bodies. Adjacent each of the side seam edges A the body is formed with an S-shaped curved wall section C which projects outwardly from the body and extends longitudinally thereof for its full length. Each side wall section C includes a straight upwardly inclined top wall section D which terminates at the seam edges A. The two curved wall sections C constitute a projected body extension E which extends the full length of the can body and which includes the two side seam edges A to be welded.

Such a can body B with its side seam edges A in slightly spaced apart relation as shown in Fig. 2 is received in the machine for welding on a mandrel 21 (Fig. 1) which is substantially the same size and cross sectional contour of the can to be welded so that the mandrel will "size" the can during the welding operation. The body may be placed on the mandrel manually or if desired the machine may be arranged for automatic feeding and removing of the body.

The mandrel 21 preferably is made in two halves or sections 22, 23 bolted together to provide a unitary structure and arranged in a horizontal position in the machine. The mandrel section 22 at one end is formed with a heavy stem 25 (Fig. 4) which is carried in a boss 26 formed in a vertical back web 27 of a box-like frame 28 which constitutes the main frame of the machine. The mandrel is secured in place by a washer 31 and a lock nut 32, the latter being threadedly attached to the outer end of the mandrel stem 25. The mandrel as a unit thus extends out from the frame back web free of all other parts so that a can body B may be readily positioned onto it, as best shown in Fig. 1. Insulating washers 33 disposed at each end of the boss 26 and an insulating sleeve 34 which completely surrounds the mandrel stem, fully insulate the mandrel from the machine frame.

The other mandrel section 23 has no stem for attaching it to the machine frame but is merely a half section of the mandrel proper and is secured to the other half by bolts 36 (Fig. 1). The heads of the bolts 36 are disposed in recesses 37 formed in the mandrel section 23 and these bolt heads engage against insulating washers 38 in the bottom of the recesses to insulate one half of the mandrel from the other. The mandrel sections are further insulated from each other by a pad 41 of insulating material and an air space 42 disposed between the mandrel pieces.

A can body B placed on the mandrel is properly located by three stop pins 45, 46, 47 (see Figs. 1 and 4). These pins are secured in the mandrel and project outwardly a distance sufficient to be engaged by the edge of the can body and thus bring its side seam edges into longitudinal alignment when the body is positioned on the mandrel and is pushed into engagement with the pins.

Provision is made for fully supporting the curved wall sections C of the body extension E while the can body is on the mandrel 21. For this purpose the mandrel is provided with a pair of cooperating extension support members 51, 52 (Fig. 1) which are set into the mandrel. These two members extend longitudinally of the mandrel for nearly its full length and are slightly longer than the length of the can body to be welded.

Support member 51 is a stationary member and is secured in place by suitable screws in a recess 54 formed in the inner flat face of the frame supported half or section 22 of the mandrel 21. The inner face of the support member is flat and is flush with the inner face of the mandrel section. The upper edge of the support member 51 projects beyond the outer periphery of the mandrel a distance equal to the inside height of the body extension E. The outer face of this projecting portion of the support member is formed with an S-shaped curved contour to correspond to and closely fit the curved side wall section C of the body extension. The top edge is formed to fit the straight angularly disposed wall D. This support member need not be insulated from the section of the mandrel in which it is carried since this part of the mandrel is already insulated from the machine frame.

The other support member 52 is a movable member and is disposed adjacent but in spaced relation to the first mentioned support member 51, as best shown in Fig. 1. This movable member 52 is located in a recess 55 formed in the inner face of the complementary half section 23 of the mandrel, the inner face of the member being flat and flush with the inner flat face of the mandrel section 23. The upper edge of the support member 52 extends beyond the mandrel and is shaped similarly to the stationary member 51 to correspond with and to closely fit the inside surface of the curved side wall section C and its straight angularly disposed wall D of this side of the body extension E.

Figure 7:
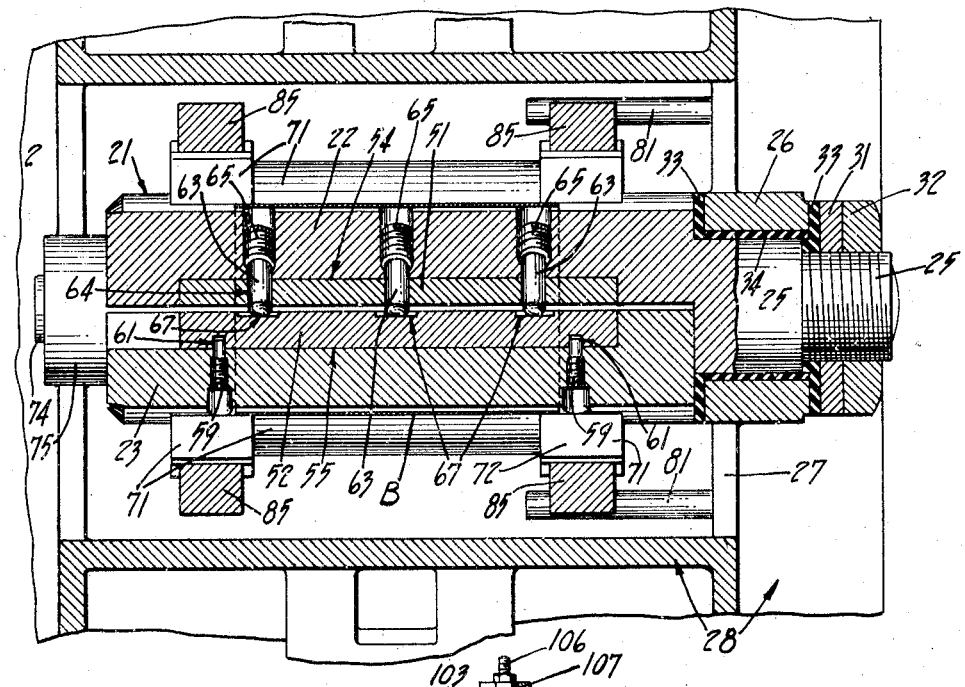
Fig. 7 is a sectional view taken substantially along the broken line 7—7 in Fig. 3.
Figure 8:
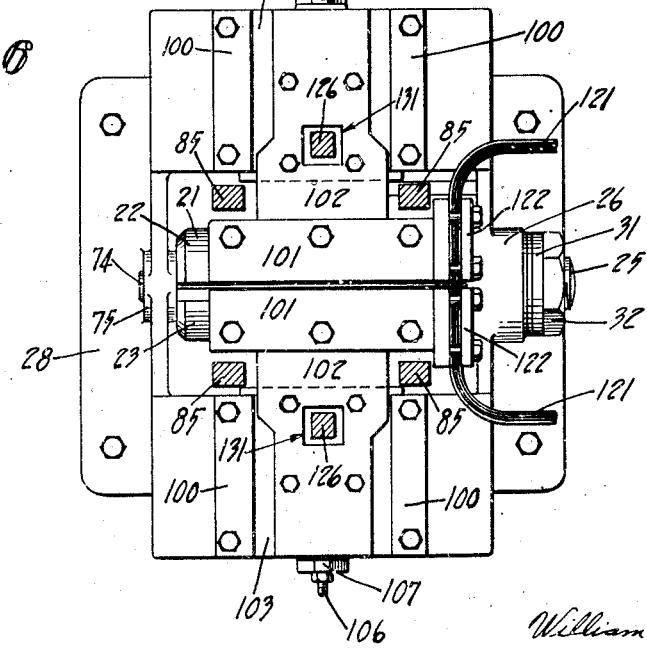

The lower edge of the movable support member 52 is formed with a cylindrical pivot element 56 which operates in a corresponding groove or socket 57 formed in the mandrel section 23 and which serves as a pivot on which the support member hinges toward and away from the stationary support member 51. The member is retained in place against endwise displacement in its pivot groove or socket 57 by a pair of setscrews 59 which are threadedly engaged in the mandrel section 23. The inner ends of the screws engage in locating slots 61 formed in the pivot element (see also Fig. 7).

The movable support member 52 is retained to provide a yielding action under the spring pressure of a compression spring 62 which is disposed in a spring barrel 63 located in a bore 64 formed in the stationary support member 51 (see Figs. 1 and 3). The spring is held in place in its barrel by a headless screw 65 which is threadedly engaged in the mandrel section 22. The inner end of the barrel is rounded and engages against a flat seat 66 formed in the flat inner face of the movable support member. This spring barrel preferably is made of insulating material. Thus the spring barrel keeps a yieldable pressure on the movable support member 52 and normally maintains a space between the two support members. Outward travel of the movable member is limited by a stop wall 67 formed in the mandrel section 23 adjacent the recess 55. The movable member 52 normally engages against this stop wall.

When a body B is located on the mandrel 21 as hereinbefore mentioned, its side walls are pressed inwardly against the mandrel to bring its side seam edges into contacting engagement with the angularly disposed top wall sections D of the body extension E forming a ridge having an included obtuse angle, as best shown in Fig. 3. This pressure against the body is brought about by a pair of side wings 71 which surround the mandrel (see Figs. 1, 3 and 7). These wings are formed with hinge lugs 72 (see also Fig. 4) carrying insulating sleeves 73 mounted on a pivot shaft 74 disposed below and parallel with the mandrel 21. The ends of the pivot shaft are carried in bearings 75 formed on the base of the machine frame 28. Insulating washers 76 disposed on the shaft between the hinge lugs and between the lugs and the bearings insulate the wings from each other and from the machine frame.

The wings 71 are normally held in an open position, as shown in Fig. 1, by a pair of tension springs 77. At one end the springs are hooked into lugs 78 formed on the wings while the other end of each spring is secured in a lug 79 formed on the base of the machine frame. Stop pins 81 secured in the back web 27 of the machine frame limit the outward travel of the wings.

Inward movement of the wings 71 toward each other to bring the edges of the body B into welding engagement is brought about preferably by vertically movable wedges 85 (Fig. 1) mounted above the mandrel. These wedges have tapered surfaces 86 and straight vertical adjoining surfaces 87 which engage against complementary tapered or cam surfaces 88 formed on the wings. There are four of these wedges 85 located two on each side of the mandrel 21 one each near each end of each wing. These wedges are bolted to a vertically movable head 89 located above the mandrel and reciprocated in any suitable manner through a downward or working stroke and thence through an up or return stroke such as for example, by a crank shaft or cam device. An insulating pad 91 is interposed between the wedges and the head to insulate these parts one from another.

The wedges 85 may be adjusted laterally of the head for proper engagement with the wings 71 by adjusting screws 92 threadedly engaged in lugs 93 which depend from the head. Lock nuts 94 on the screws are provided for locking the screws in an adjusted position. The inner ends of the screws engage against a button 95 of insulating material set into a recess formed in the wedge to insulate the screws from the wedges.

The normal position of the head 89 is that shown in Fig. 1 where the head is at the top of its up or return stroke with the wedges 85 clear of and above the wings 71. When the head moves down through a working stroke it brings the wedges down so that their tapered surfaces 86 engage against the cam surfaces 88 on the wings. This presses both wings simultaneously in an inward direction toward the mandrel. This movement of the wings also presses the can body B and its extension sections C into tight fitting engagement with the mandrel 21 and with the body extension support members 51, 52. The movable support member 52 yields just enough to permit the side seam edges A of the body to come into full contacting engagement with each other for the welding operation.

This movement of the wings 71 takes place during only a short travel of the downward movement of the wedges, until the tapered portions of the wedges move past the cam surfaces 88 of the wings. The adjoining straight vertical portions 87 of the wedges then come adjacent the cam surfaces 88 of the wings and hold the wings and the can body parts in their compressed position while the head 89 continues to move down throughout the remainder of its working stroke. During this remaining portion of the working stroke the welding operation is performed.

The welding of the engaged edges A of the body is effected by a pair of horizontally disposed electrodes 101 (Figs. 1, 3, 4 and 6) which extend along the seam to be welded for its full length. There is one electrode on each side of the seam, in opposing relation and at an elevation substantially tangent to the top of the body extension E.

Figure 5:
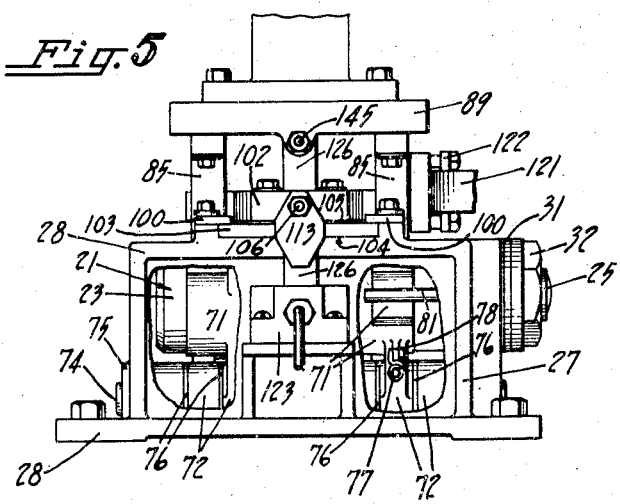
Fig. 5 is a side view of the machine shown in Fig. 1, with parts broken away, and shown on a reduced scale.

These electrodes 101 are mounted on opposing horizontal carriers 102 adjustably secured to slides 103 (see also Fig. 5) which operates in slideways 104 formed in the top of the main frame 28 at each end thereof. Gibs 100 secured to the top of the machine frame retain the slides in their slideways. An insulating pad 105 is interposed between each carrier and its slide to insulate the electrodes from the machine frame. Adjustment of an electrode carrier along its slide is effected by way of a setscrew 106 which is threadedly engaged in a lug 107 formed on the outer end of the slide. A lock nut 108 is provided for locking the screw in an adjusted position. The inner ends of the screws engage against insulating buttons 109 set into recesses formed in the outer ends of the carriers to insulate the carriers from the screws.

The normal position of the electrodes 101 and their carriers 102 is that shown in Fig. 1, the electrodes being in a widely separated and retracted relation. The electrodes are retained in this retracted position under pressure of a pair of compression springs 111 which are housed in recesses 112 formed in the machine frame 28 immediately below the slideways 104. Each spring is interposed between the frame and a depending lug 113 (see also Fig. 5) formed on the outer end of each slide 103. The outward travel of the slides under the resistance of the springs is limited by stop pins 114. Each pin projects from its associated slide into a restricted slot 115 formed in the machine frame at the bottom of the slideways.

Electric welding current is supplied to the electrodes 101 by way of laminated bus bars 121 (Figs. 5 and 6) which are connected to the electrodes by clamps 122. These bus bars lead from a suitable transformer, the electric current output of which is controlled by a normally open electric switch 123 (Fig. 1).

Welding of the positioned edges A of the body B on the mandrel 21 is effected by an inward movement of the electrodes 101 toward each other. This movement is brought about by a pair of bar cams 126 which are adjustably bolted to and extend down from the reciprocating head 89. These bar cams extend down through clearance openings 131, 132, 133, 134, formed respectively in the carrier 102, the insulating pad 105, the slide 103, and the machine frame 28. The inner edge of each bar cam is formed with two stepped cam surfaces, which listed from the bottom of the bar upwardly, comprise a long straight cam surface 136 and a short inwardly projecting step 137. The bar cam on the side of the movable extension support 52 is formed with a third step, a shallow further inwardly projecting step 138. The long cam surface 136 of each cam normally engages against a straight cam surface 141 of the slides 103 in the clearance recesses 133.

Provision is made for adjusting the bar cams 126 relative to the head 89 for proper operation of the electrode slides 103. This adjustment may be brought about by setscrews 145 which are threadedly engaged in lugs 146 which depend from the head 89. Locknuts 147 are provided for locking the screws in an adjusted position. The inner ends of the screws engage against insulating buttons 148 which are set into recesses in the bar cams for insulating these cams from the screws.

During the downward movement of the head 89 while it is moving through its working stroke the bar cams 126 are pushed downwardly through their clearance openings, the cam surface 136 of each cam sliding along the cam surface 141 of each slide 103. After the wedges 85 have shifted the wings 71 into position for clamping the can body B against the mandrel 21 as shown in Fig. 3 as hereinbefore mentioned, a tapered step 151 adjoining the cam step 137 on the bar cam 126 comes into engagement with a tapered cam surface 152 connecting with the cam surface 141 of the slide 103 and thus pushes the two slides inwardly simultaneously toward each other from opposite sides of the body extension supports 51, 52 on the mandrel.

This inward movement of the slides 103 toward each other brings the inner ends of the electrodes 101 into engagement with the top wall sections D of the body extension E. Since the electrodes are located on opposite sides of the seam to be welded this forces the edges A of the body tightly together and clamps them and the adjoining top wall sections D against the top edges of the body extension supports 51, 52 as shown in Fig. 3.

This pressure against the top of the body extension is accompanied by a scrubbing or brushing action of the electrodes across the top wall sections D of the body extension. This greatly facilitates good contact between the electrodes and the extension of the can body.

For this purpose the inner end of each electrode is formed with a tapered nose having a flat straight inclined surface 155 extending along the bottom. Such surfaces taper upwardly toward the forward or inner edges of the electrodes, as best shown in Fig. 1, and correspond with the contour of the top edges of the body extension supports.

Immediately following this inward movement of the electrodes and while the electrodes are holding the edges A of the can body in tight contacting engagement with each other, the continued downward travel of the head 89 brings a tapered surface 157 formed on the lower end of one of the bar cams 126 into engagement with a movable element 158 of the electric switch 123. This closes the switch as shown in Fig. 3.

Closing of the switch immediately establishes a welding circuit and electric current flows from the transformer, along the bus bars 121 to one of the electrodes, thence into the engaged top wall section D on body extension E returning by way of the other electrode to the transformer. The electric current flowing along this circuit across the engaged edges A of the can body immediately heats these edges to welding temperature and thereby fuses them together.

During this heating of the seam edges A the electrode adjacent the movable support 52 is moved further inwardly toward the mandrel and thus presses the engaged edges together while they are in a molten condition. This facilitates fusing of the edges and completes the weld which permanently joins these edges in a side seam. This further movement of the electrode is effected by the cam step 138 on the bar cam 126 as this cam step comes into engagement with the cam surface 152 of the slide 103 and rides down onto the surface 141 while the head 89 continues to move down. The movable extension support member 52 yields by hinging on its pivot 56 during this further movement of the electrode. This insures more complete joining of the seam edges A.

This welding of the seam edges A is completed upon completion of the downward movement of the head 89 and the head immediately and rapidly moves upwardly through its return stroke. During this return stroke the cam bar 126 is withdrawn from engagement with the electric switch 123. This cuts off the flow of current through the electrodes. At a sufficient distance of travel the ascending bar cams 126 permit the electrode slides 103 to withdraw the electrodes 101 from the body extension E of the welded can body.

The wedges 85 also move up with the head and release the wings 71 so that they will pivot away from the mandrel 21 under the tension of their springs 77. The welded can body is thus left on the mandrel free of any clamping devices so that it may be readily removed for subsequent operations. This completes the welding cycle. It should be understood that this entire cycle of operations is effected at a high rate of speed and results in proper welding of the seam without burning the thin edges being welded.

If desired the electrodes 101 may be maintained in a cooled condition by circulating therethrough a fluid cooling medium. For this purpose each electrode adjacent its tapered contacting surface 155 is formed with a longitudinal passageway 161 (Figs. 1 and 4). The passageways have at their ends short angularly disposed channels 162 which communicate with inlet and outlet tubes 163 secured in the electrode. These tubes lead from any suitable source of supply of the cooling medium and return to this source or to a suitable place of discharge.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for electric butt-welding a container body having opposed longitudinal side seam edges in a two part projected extension of said body, the combination of a mandrel for receiving and supporting a container body, a fixed support means, a yieldable cooperating support means, both of said means being located on said mandrel for severally supporting the two sections of the extension of said body, a pair of wing members adjacent said mandrel for clamping said container body around said mandrel and for clamping said body extension against said support means, a pair of slide blocks disposed adjacent said wing members for movement toward said mandrel, a pair of oppositely disposed welding electrodes secured in said slide blocks and engageable with said body extension from opposing sides for conducting welding current across the side seam edges to be welded, and a reciprocable head carrying a plurality of actuating elements engageable with said wing members and said electrodes for shifting said wing members and said electrodes in timed relation to weld the side seam edges of said body extension together along their entire length simultaneously.

2. In a machine for electric butt-welding a container body having opposed longitudinal side seam edges in a projected extension of said body, the combination of a mandrel for receiving and supporting a container body, a fixed support means, a yieldable cooperating support means, both of said means being on said mandrel for supporting the extension of said body, a pair of wing members adjacent said mandrel for clamping said container body around the mandrel and for clamping said body extension against said support means, a pair of slide blocks disposed adjacent said wing members for movement toward said mandrel, a pair of oppositely disposed welding electrodes secured in said slide blocks and engageable with said body extension from opposing sides for conducting welding current across the side seam edges to be welded, a reciprocable head carrying a plurality of actuating elements engageable with said wing members and said electrodes for shifting said wing members and said electrodes in timed relation to weld the side seam edges of said body extension together along their entire length simultaneously, switch means for controlling the application of the welding current to said electrodes, and an actuating element carried on said head and engageable with said switch means during the reciprocation of said head for opening and closing said switch means.

3. In a machine for electric butt-welding a container body having opposed longitudinal side seam edges located in a projected extension of said body, the combination of a mandrel for receiving and supporting a container body, a fixed support on said mandrel having an outer wall corresponding in shape to an inner surface of the said container body extension, a movable support disposed on said mandrel adjacent said fixed support and having an outer wall corresponding in shape to another inner surface of said container body extension, said supports yieldably supporting said body extension when the container body is in position on said mandrel, and a welding electrode disposed adjacent said movable support and engageable with the intervening portion of the body extension for pressing said side seam edges together to simultaneously weld the edges along their entire length while in such pressed position.

4. In a machine for electric butt-welding a container body having opposed longitudinal side seam edges located in a projected extension of said body, the combination of a mandrel for receiving and supporting a container body, a fixed support secured to said mandrel and projecting therefrom and having an outer wall corresponding in shape to an inner surface of one side of said projected container body extension, a movable support disposed on said mandrel and projecting therefrom adjacent said fixed support said movable support having an outer wall corresponding in shape to the inner surface of the opposite side of said projected container body extension, said supports supporting the two opposite sides of said body extension when the container body is in position on said mandrel, wing members located adjacent said mandrel and having inner walls corresponding in shape to the outer walls of said mandrel and said supports for clamping the container body around the mandrel with the body extension clamped on said supports, a pair of welding electrodes movable toward said supports each electrode being engageable with its corresponding projected container body extension for clamping the two portions of the body extension on opposite sides against said supports, and means for moving said electrodes toward each other for pressing the side seam edges of the body extension together to simultaneously weld the edges along their entire length while in such pressed position.

5. In a machine for electric butt-welding a container body having opposed longitudinal side seam edges located in a projected extension of said body said extension being formed with an S-shaped wall section merged into an inclined straight wall section adjacent each of said edges, the combination of a mandrel for receiving and supporting a container body, a fixed support secured to said mandrel and projecting therefrom and having an outer S-shaped wall merged into an inclined straight wall section corresponding in shape to one side of said body extension, a movable support disposed on said mandrel and projecting therefrom adjacent said fixed support and having an outer wall corresponding in shape to the opposite side of said body extension, the said supports severally supporting the corresponding parts of said body extension when the container body is in position on said mandrel, wing members located outside of said mandrel and having inner walls corresponding in shape to the outer walls of said mandrel and said supports for clamping the container body around the mandrel with the body extension clamped on said support and with the inclined straight wall edges in contact, a pair of welding electrodes movable toward said supports, means for moving said electrodes against the straight wall sections of said body extension for clamping the corresponding intervening walls against the adjacent supports and for pressing the side seam edges of the body extension together for simultaneously welding the straight wall sections of said body extension along their entire length, and means for additionally moving one of said electrodes during the welding operation for further pressing said edges together to complete the weld.

WILLIAM P. WINTERS.

REFERENCES CITED

The following references are of record in the file of this patent:

UNITED STATES PATENTS

| Number | Name | Date |
| --- | --- | --- |
| 1,190,902 | Hood | July 11, 1916 |
| 1,205,511 | Butcher | Nov. 21, 1916 |
| 1,534,422 | Smith et al. | Apr. 21, 1925 |
| 1,816,864 | Murray | Aug. 4, 1931 |
| 1,850,176 | Lawson | Mar. 22, 1932 |
| 1,872,055 | Andren et al. | Aug. 16, 1932 |
| 1,883,911 | Heineman | Oct. 25, 1932 |
| 1,993,960 | Fenzel et al. | Mar. 12, 1935 |
| 2,272,633 | Borgadt | Feb. 10, 1942 |